F. C. BARGAR.
VEHICLE WHEEL.
APPLICATION FILED SEPT. 24, 1917.
1,359,949.
Patented Nov. 23, 1920.
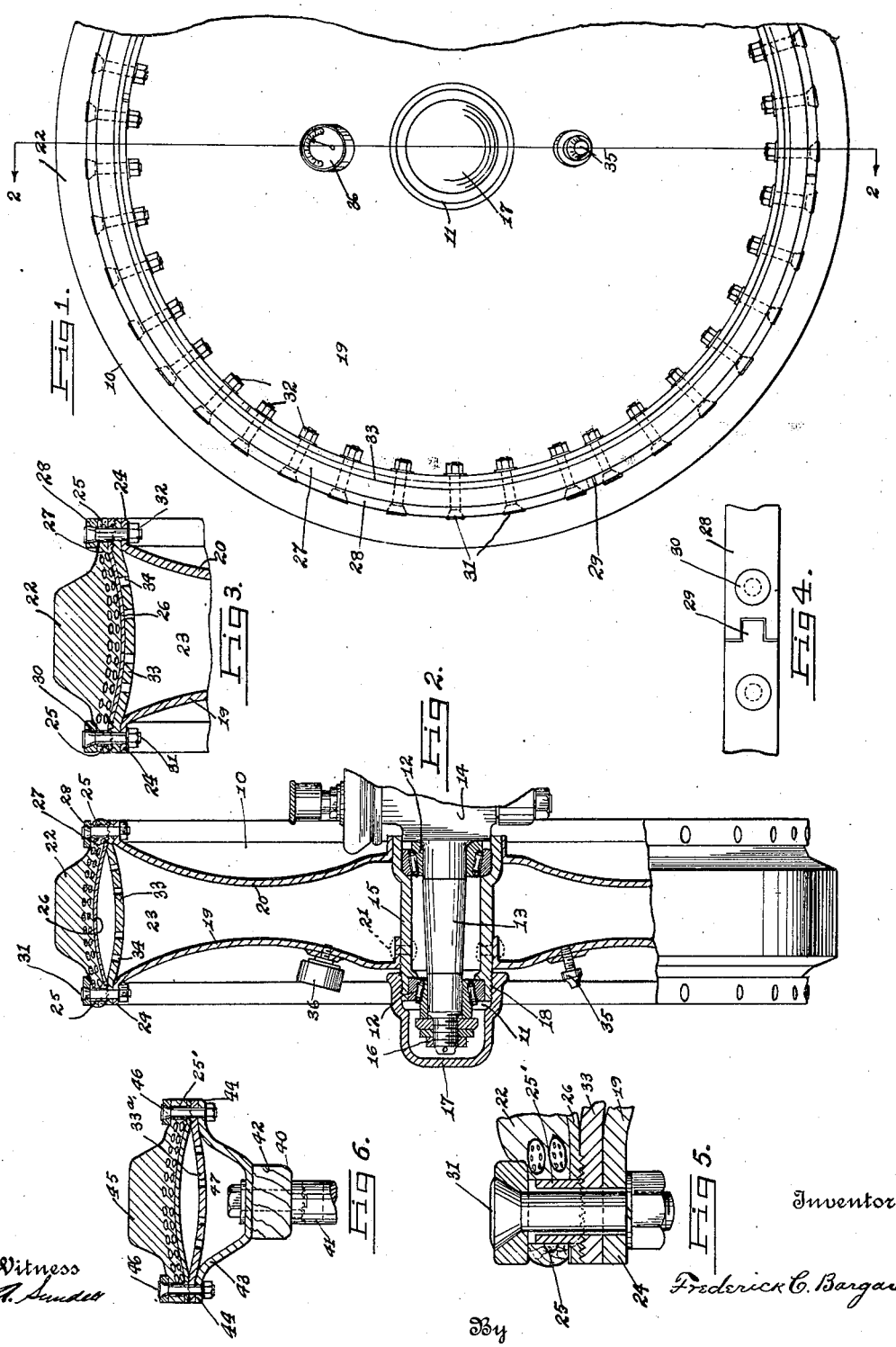

UNITED STATES PATENT OFFICE.

FREDERICK C. BARGAR, OF COLUMBUS, OHIO.

VEHICLE-WHEEL.

1,359,949.   Specification of Letters Patent.   Patented Nov. 23, 1920.

Application filed September 24, 1917. Serial No. 192,917.

*To all whom it may concern:*

Be it known that I, FREDERICK C. BARGAR, a citizen of the United States, residing at Columbus, in the county of Franklin and State of Ohio, have invented certain new and useful Improvements in Vehicle-Wheels, of which the following is a specification.

The object of the invention is to produce a vehicle wheel wherein is embodied a hub structure, a casing being rigidly connected with said structure and in combination with a tire member adapted to encircle said casing so as to provide a fluid compartment within the wheel, whereby when the compartment contains a fluid under a suitable pressure said tire member will be maintained in an inflated and operative condition.

Another object of the invention resides in a vehicle wheel of this character wherein the fluid compartment is provided with a rigidly supported collar, the latter serving to limit or arrest the inward movement of said tire when the latter is depressed in an unusual degree, as when operating over a rough roadway.

A further object rests in providing efficient clamping means for securing the marginal edges of said casing, tire member and collar in rigid association, so as to produce a durable and substantial construction, convenient to repair or to take apart, and to effectively prevent the seepage of fluid from said compartment therethrough.

The preferred embodiments of the present invention have been illustrated in the accompanying drawing, in which—

Figure 1 is a side elevation of the vehicle wheel embodying the features of the invention.

Fig. 2 is a vertical sectional view of the same, taken along the line 2—2 of Fig. 1.

Fig. 3 is a similar view showing the tire member in a depressed condition.

Fig. 4 is a detail top plan view of the joint existing between the ring members.

Fig. 5 is a detailed sectional view on an enlarged scale of the clamping mechanism.

Fig. 6 is a detailed sectional view disclosing a slightly modified form of the invention.

Similar characters of reference designate corresponding parts throughout these several views of the drawing.

Referring more particularly to Figs. 1 to 5 of the drawing, the wheel 10 consists of a hub structure 11, rotatably supported by means of roller bearings 12, upon an axle or spindle 13, the latter forming a part of a steering knuckle 14. It is thought advisable to state at this juncture, however, that it is not essential to the present invention to rotatably maintain the wheel 10 upon said axle, as it may be employed in the capacity of a driving wheel by simply fixing the same to an axle in a manner common in vehicle wheel construction, and which, therefore, has not been deemed necessary to illustrate. The hub structure includes a metallic sleeve 15 which is retained in its rotatable position upon the angularly situated bearing 12 by means of securing nut 16. A cap piece 17 is threaded as at 18 upon the outer extremity of the sleeve 15 and protects in the usual manner the interior of the hub structure.

One of the main features of the wheel resides in providing the sleeve 15 with spaced, substantially concaved plates 19 and 20, preferably formed of metal, said plates being secured in any desired manner on the sleeve so as to provide a tight joint therebetween, the latter being designed to prevent the seepage of a fluid through the same. Rivets 21, as shown on dotted lines in Fig. 2, may be employed in this connection if deemed advisable. The plates are utilized to act in the capacity of a spoke structure, that is to provide means for supporting the tread or tire member 22 of said wheel and said plates being spaced to provide an air compartment or chamber 23 therebetween, the purpose of the latter being clearly disclosed in the following description.

The outer circumferential edges 24 of the plates are angularly bent to provide securing surfaces for the purpose of connecting the tread or tire member thereto. The member 22 is preferably formed from rubber or a manufacture thereof, so as to possess resilient or elastic qualities and the inner surface of the tread has fabric layers formed therein for the purpose of increasing the tenacity of that part of the tire. The edges of said member are formed with a plurality of spaced openings 25, which are adapted to receive metallic sleeve 25′, said openings 25 being adapted to register with similar openings formed in the edges 24 of the plates 19 and 20. A fabric section 26 is interposed between the member 22 and the edges 24 and covers the inner surface of said tire member, this section being employed to provide a fluid proof joint between the elements with which it is associated.

In order to clamp or unite the tread member 22 with the edges 24 of the plates 19 and 20, said member is provided with substantially flattened and reduced edges 27 in which the metallic sleeve protected openings 25 are situated, and surrounding the outer surfaces of these edges are rings 28 the latter being formed from a plurality of segmental sections which have the ends thereof formed with interfitting joints 29. Countersunk openings 30 are provided in these rings and in position to aline with the openings 25 of the tire member and the openings formed in the edges 24 of said plates and adapted to pass through these openings are a plurality of securing elements 31, in the form of headed bolts. The shanks of the latter extend inwardly beyond the edges 24 and are provided with threads for the reception of nuts or similar binding elements 32. It will be apparent that by threading the latter upon the bolts and binding the same into close frictional relation with the inner surfaces of edges 24, that the edges 27 of the tire member will be drawn down into firm engagement with the preferably serrated edges of a rigid collar 23, whereby the wheel elements, consisting of the plates 19 and 20, the tire member 22 of the collar 33 will be securely bound together.

With regard to the collar 33 it is advisable to state that this element is preferably formed from metal and in width is substantially equal to the distance between the outer surfaces of the edges 24. The collar is adapted to be fitted upon the edges 24 and is provided with openings for the reception of the bolts 31, whereby the same is secured to the plates and tire member in the manner above mentioned. In cross section the collar is substantially concaved and is provided with a plurality of perforations 34 to permit of the circulation of air therethrough.

From the foregoing it will be evident that the air or fluid compartment 23 is formed between the said plates 19 and 20, the inner periphery of the compartment being bounded by the sleeve 15 and its outer periphery bounded by the tire member 22. Air under pressure is introduced into the compartment by means of an inlet check valve 35 of common construction, and it will be seen that the pressure of air contained within said compartment will force against the inner surface of the tire member, so as to retain the latter in the extended or inflated condition, shown in Fig. 2 of the drawing, air reaching the inner surface of the tire through the perforations provided in the collar 33. Thus the tire will render the same service and perform the same functions as will the ordinary pneumatic tire of common usage, but it will be of a more durable construction, designed for a longer service and to be free from the disadvantage resulting from "blowouts" or punctures. A gage 36 is carried by the plate 19 and is in communication with the compartment 23, so as to provide a visible means of determining the pressure of the fluid contained within said compartment.

The collar 33 is so located with regard to tire member, that when the latter is depressed inwardly a certain distance, the inner surface of said member will engage the collar to prevent further movement thereof. The perforations 34 of the collar, however, prevent the latter from interfering with the action of the fluid within the compartment upon the inner surface of the tire member, as will be clearly understood. Due to the concaved cross sectional formation of the collar and to the inner inflated curved surface of the tire member, the latter will be allowed considerable movement before engaging with the collar, in the manner shown in Fig. 3, and when the depressed condition of the tire is relieved the same will resume the inflated position by the combined action of its own inherent resiliency and through the more positive agency of the air within said compartment.

Thus it will be apparent that there is provided a wheel wherein the objects of the invention have been achieved and that all the advantageous features above mentioned are, among others, present. By forming the parts of the wheels substantially from metal a strong, durable and substantial construction is secured and, also, one that can be economically manufactured and conveniently assembled.

Of course, it will be appreciated that numerous changes may be made in the structural features of the invention from that above described and illustrated, without drastically departing from the fundamental principle of the invention. For instance, as shown in Fig. 6, the ordinary spoke and felly construction has not been omitted, as is the case in the preferred form, and still an efficient construction is embodied, which falls within the ambit of the invention. In this modified form, which is adapted for all light vehicle purposes, the wheel 40 consists of the usual spoke and felly construction, 41 and 42 respectively, and to the periphery of the latter is suitably secured a casing 43 in the form of a substantially channeled or grooved ring, which terminates in flared edges 44. The tire 45 is secured to the edges by means of the securing bolts 46 in substantially the same manner as the member 22 is secured to edges 24 of the preferred form of the wheel, and the perforated collar 33ª is rigidly interposed between the tire and the casing and is employed in the same capacity as the collar 33, hence the description of its utilities will be omitted. In practice, the compartment 47 is suitably filled with a quantity of air so tight that the fluid will press against the inner surface of the tire 45, whereby the latter will be maintained in the inflated condition shown in Fig. 5.

Thus it will be obvious that the forms of the invention as described are identical in principle and operation, and while but two of these forms have been illustrated and described it is apparent that other forms and constructions embodying the same principle might still be utilized and constructed, provided that the same fall within the scope of the following claims.

Having described the invention what is claimed as new and patentable is:

1. In a vehicle wheel, the combination with a hub structure of a wheel body including an annular air compartment, a vented inwardly curved rim formed upon the periphery of said body and providing a tire seat, and a substantially flat tire secured to and surrounding said rim whereby the expansion and compression movements thereof will be substantially equal in degree.

2. In a vehicle wheel, the combination with a hub structure, of a wheel including a plurality of spaced plates the latter forming the side walls of an air compartment, a perforated rim forming a tire seat peripherally surrounding and secured to the said plates, and a substantially flat tire secured to said rim and forming the peripheral wall of said compartment, said tire being so disposed with relation to said rim that the expansion and compression movements thereof will be substantially equal in degree.

3. In a vehicle wheel, the combination with a hub structure, of a casing rotatable with such structure and formed to include an air chamber, outwardly flared flanges formed upon the peripheral edges of said casing, a substantially flat tire encircling said casing and having the outer edges thereof reduced and disposed to coöperate with said flanges, a perforated metallic collar or rim interposed between said flanges and said tire member and serving to regulate the degree of depression of the latter, and binding elements radially inserted through said tire, collar and flanges and serving to secure the aforesaid wheel elements in assembled relation.

4. In a vehicle wheel, in combination with a hub structure, of a plurality of spaced plates rotatable with said structure and defining the side walls of an air chamber, outwardly flared flanges integrally formed upon the peripheral edges of said plates, a substantially flat tire encircling said flanges and forming the peripheral wall of said air chamber, a perforated metallic collar interposed between said tire and plate flanges and serving to regulate the degree of depression of said tire, and radially inserted securing elements disposed on both sides of said tire and passing through said tire, collar and flanges, and retaining the latter wheel elements in assembled relation.

In testimony whereof I affix my signature in presence of two witnesses.

F. C. BARGAR.

Witnesses:
 WALTER E. L. BOCK,
 ARVID G. SUNDERS.